(12) United States Patent
McMichael

(10) Patent No.: US 6,941,339 B1
(45) Date of Patent: Sep. 6, 2005

(54) STATED NETWORK PORTAL SYSTEM AND METHOD

(75) Inventor: Chase Kenyon McMichael, Houston, TX (US)

(73) Assignee: UnBound Technologies Inc., Menlo Park, CA (US)

( * ) Notice: Subject to any disclaimer, the term of this patent is extended or adjusted under 35 U.S.C. 154(b) by 0 days.

(21) Appl. No.: 09/572,634

(22) Filed: May 17, 2000

(51) Int. Cl.[7] .............................................. G06F 15/16
(52) U.S. Cl. ........................... 709/203; 709/224; 705/1; 705/10
(58) Field of Search ................................ 709/203, 224; 705/1, 10; 714/47; 707/103; 370/263, 236; 382/305; 340/825

(56) References Cited

U.S. PATENT DOCUMENTS

| | | | |
|---|---|---|---|
| 4,692,858 A | | 9/1987 | Redford et al. ............. 364/200 |
| 4,782,463 A | | 11/1988 | Sanders et al. ............. 354/900 |
| 4,811,240 A | | 3/1989 | Ballou et al. ............... 364/518 |
| 4,866,638 A | | 9/1989 | Cosentino et al. .......... 364/521 |
| 5,021,976 A | | 6/1991 | Wexelblat et al. .......... 364/521 |
| 5,041,992 A | | 8/1991 | Cunningham et al. ...... 364/518 |
| 5,049,873 A | * | 9/1991 | Robins et al. ......... 340/825.01 |
| 5,115,501 A | | 5/1992 | Kerr ........................... 395/600 |
| 5,119,475 A | | 6/1992 | Smith et al. ................ 395/156 |
| 5,121,477 A | | 6/1992 | Koopmans et al. ......... 395/156 |
| 5,179,657 A | | 1/1993 | Dykstal et al. ............. 395/161 |
| 5,179,700 A | | 1/1993 | Aihara et al. ................ 175/65 |
| 5,327,529 A | | 7/1994 | Fults et al. ................. 395/155 |
| 5,754,857 A | * | 5/1998 | Gadol ........................ 709/203 |
| 5,974,201 A | * | 10/1999 | Chang et al. ............... 382/305 |
| 6,138,156 A | * | 10/2000 | Fletcher et al. ............. 709/224 |
| 6,199,047 B1 | * | 3/2001 | Dimino et al. ................ 705/10 |
| 6,442,140 B1 | * | 8/2002 | Kirschenbaum .......... 370/236.1 |
| 6,449,739 B1 | * | 9/2002 | Landan ......................... 714/47 |
| 6,519,568 B1 | * | 2/2003 | Harvey et al. ................. 705/1 |
| 6,526,442 B1 | * | 2/2003 | Stupek et al. ............... 709/224 |
| 6,678,696 B1 | * | 1/2004 | Helland et al. .......... 707/103 R |

OTHER PUBLICATIONS

Carnegie Mellon Online: Web–mediated education; Rehak, D.R.;; Frontiers in Education Conference, 1997. 27th Annual Conference. 'Teaching and Learning in an Era of Change'. Proceedings. , vol.: 3 , Nov. 5–8, 1997.*

Integrated algorithms for newspaper page decomposition and article trackingGatos, B. Mantzaris, S.L.; Chandrinos, K.V.; Tsigris, A.; Perantonis, S.J.; Document Analysis and Recognition, 1999. ICDAR '99. Proceedings of the Fifth International Conference o.*

The Time/Place/Object model for tracking and history management in manufacturing line control; Database Applications in Non–Traditional Environments, 1999. (DANTE '99) Proceedings. 1999 International Symposium on , 1999.*

* cited by examiner

*Primary Examiner*—Thong Vu
(74) *Attorney, Agent, or Firm*—Akin, Gump, Strauss, Hauer & Feld; Dwayne L. Mason

(57) ABSTRACT

Disclosed is a system and method for a stated network portal that is adaptable to a wide variety of network applications, such as the Internet. The invention encompasses a system and method for dynamically adjusting portal views accessed by the user, according to the state of the system, as defined through the use of a rules database. The rules database is adjustable and customizable by the user, so as to provide for the automatic generation of output to the user which is intelligent to the data which the user requires. The rules database also accommodates time-sensitive rules, so that certain rules within the database are operable only under certain times or operate perpetually as the system operates.

31 Claims, 5 Drawing Sheets

STATED NETWORK PORTAL SYSTEM AND METHOD

TECHNICAL FIELD

The instant invention relates in general to the field of networking technology. More specifically, the instant invention is a system and method for providing and using a stated portal server for use in wide-area networks (WANs) such as the Internet.

BACKGROUND INFORMATION

Wide-area networking has become prevalent, particularly with the creation of a globally-based WAN, the Internet. The Internet is a network based on the Transmission Control Protocol/Internet Protocol (TCP/IP) The TCP/IP protocol is well-suited to connectivity between a wide-variety of machines, permitting a great diversity in the types of machines which are connected to the Internet.

With the great diversity of machines available to connect to the Internet has also come a great diversity of information and content available via the Internet. Users of the Internet can, quite literally, find information on sports, news, weather, computers, health, public filings, classifieds, and more. Users have a number of different forums in which to view this wealth of data: encyclopedia sites, dictionary sites, dedicated-topic sites, newspaper/magazine article sites, file directory sites, and the like. Additionally, users have a number of different options for the format in which to receive the data available on the Internet: HyperText Transfer Protocol (HTTP), Gopher, File Transfer Protocol (FTP), etc. Also, users have a choice of languages in which to receive information.

With such a great realm of information and data available to users, it is becoming more and more common for users to get "lost" on the Internet. Search engines are commonly available (such as Yahoo!™, Alta Vista™, HotBot™, and the like). However, the results from searches run through these engines can be overwhelming. For example, recently a search on the term "Chicago" yielded more than 7,000 resulting Internet sites.

As an answer to this problem, many companies have developed "portal" sites, directed to bringing content to the users in a more user-friendly manner. These sites contain directories of information available on the Internet. Frequently, these portal sites feature an editorial selection process or rating features, in order to direct the user to the "best" source of the information the user seeks. Sometimes these editorial selections or rating features are influenced by advertising dollars, making it difficult for the user to determine which sites truly have the information desired.

Recently, some portal sites have permitted the user the ability to customize a portal site. Users can specify a set of information to be displayed each time they visit the site. These customized portals frequently operate on the basis of a "cookie" stored on the user's machine. The cookie is a type of identifying file. When the Internet site is first accessed, the site looks to see if a pre-defined cookie is on the machine accessing the site. If it is, then the user's customized site appears; if not, then the user is prompted to enter a username/password or prompted to create a new customized portal.

Customized portals permit users to specify the types of news headlines they would like to see, along with the potential to specify weather reports, horoscope reports, sports synopses and the like. A user may chose which of these types of information (and more) to be displayed upon startup. The same information is then displayed to the user each time the site is accessed, until the user manually modifies the site to display other information.

While customized portals do provide greater access for the common user to enter the Internet, they do not yet fully-utilize the potential of the networked computer. Specifically, the customized portals, like the original portal sites and like most of the sites accessed at the startup of an Internet connection, are static. The problem is that no user lives in a static world.

What is needed is a portal system and method to provide a user dynamic information based upon a set of intelligence rules such that the user can efficiently reach points of changing interest on the Internet. What is also needed is a system and method for making such a system user-friendly and comprehensive, so that it can be commonly used for a number of different applications.

SUMMARY

The invention is a stated network portal system and method that is adaptable to a wide variety of network applications, such as the Internet. The invention encompasses a system and method for dynamically adjusting portal views accessed by the user, so that the portal takes on new significance as a point through which the user may quickly and efficiently access the information most pertinent for the time and place of access. The invention is well-suited to the common Internet user, but those skilled in the art will readily recognize its many applications to networks at large.

The invention comprises a user machine, a network, a generating server, and a dynamic interface server. The user machine is connected to the network and to the generating server. The user machine provides the normal interface component functions to the user. The network can be the Internet or any number of other network applications, generally of wide implications.

The generating server is connected to the dynamic interface server and the user machine and serves to provide a communication method between the two. In an Internet context, the generating server may create HyperText Markup Language (HTML), Java script, Java code, eXtendable Markup Language (XML), or other communication language for distribution to the user machine, based upon the information that the dynamic interface server wishes to communicate to the user. However, those skilled in the art will appreciate that the generating server could generate various types of code as might be required to communicate to the user machine.

The dynamic interface server is the heart of the invention, providing the dynamic content to the generating server for provision to the user machine. The dynamic interface server comprises a rules engine, a rules database, and a customization interface. The dynamic interface server collects information from the network and from the user machine in order to determine and track different states. The dynamic interface server then provides information to the user based upon the state, as dictated by the rules structure, stored in the rules database, as applied by the rules engine.

The system and method of the instant invention functions to provide the user with a dynamic portal for accessing the network system. The invention tracks the states of operation, based upon a variety of definable factors. The factors may be simple, such as time of day, location of access, or mode of access (such as through a Gopher engine or Java engine, as opposed to access through an HTML engine). Factors affecting states may also be very complex, based upon keywords found in e-mails received, bank accounts reaching certain levels at certain times of day, stock prices fluctuating between certain minimums and maximums over a certain period of time.

As a result of the factors triggering the states, the system generates content to the user which is intelligent to the information that the user needs or wants, depending upon the factors. For example, extreme fluctuations in a certain stock over a certain time period may trigger a state which sends an alert to the user and adds a link to a trading site prominently within the field of view on the screen. Such a state-oriented system has the effect of simplifying access to a large network system, speeding access and decreasing the work required of the user to accomplish tasks over the network.

The foregoing has outlined broadly the features and technical advantages of the present invention in order that the detailed description of the invention that follows may be better understood. Additional features and advantages of the invention will be described hereafter which form the subject of the claims of the invention.

BRIEF DESCRIPTION OF THE DRAWINGS

For a more complete understanding of the present invention, and the advantages thereof, reference is now made to the following descriptions, taking in conjunction with the accompanying drawings, in which.

DETAILED DESCRIPTION

In the following description, numerous specific details are set forth, such as computer programming languages, database structures, computer operating systems, network structures, microprocessors, protocols, input/output (I/O) systems, and the like, to provide a thorough understanding of the invention. However, it will be obvious to those skilled in the art that the present invention may be practiced without such specific details. In other instances, well-known protocols, data formats, computer equipment, and network systems have been shown in block diagram form in order to not obscure the present invention in unnecessary detail. For the most part, details concerning timing considerations, specific languages and database structures used, specific networking details, and the like have been omitted inasmuch as these details are not necessary to obtain a complete understanding of the present invention and are well within the skills of persons of ordinary skill in the art.

The invention is a stated network portal system and method that is adaptable to a wide variety of network applications, such as the Internet. The invention encompasses a system and method for dynamically adjusting portal views accessed by the user, so that the portal takes on new significance as a point through which the user may quickly and efficiently access the information most pertinent for the time and place of access. The invention is well-suited to the common Internet user, but those skilled in the an will readily recognize its many applications to networks at large.

The instant invention is generally, though not exclusively, implemented through a series of servers and interface components and is well-suited to the client-server model. The instant invention is very adaptable and can be used in a number of different formats and protocols, depending upon the servers and interface components involved. For example, the instant invention is well-suited for use in an Internet context, in which case the servers and interface components may be operable to communicate over a TCP/IP protocol. Further, the Internet context may provide a forum for the display of HTML, XML, or Java pages, in which case the invention is readily adaptable to providing translation to those languages for transmission. However, the instant invention is equally well-suited for use in the corporate wide-area network context. Given a system of servers and interface components communicating over an Internetwork Packet eXchange (IPX) network and applications for accessing Open DataBase Connectivity (ODBC) structures, the instant invention can prove equally useful in providing dynamic information in an intelligent manner.

Figure 1:
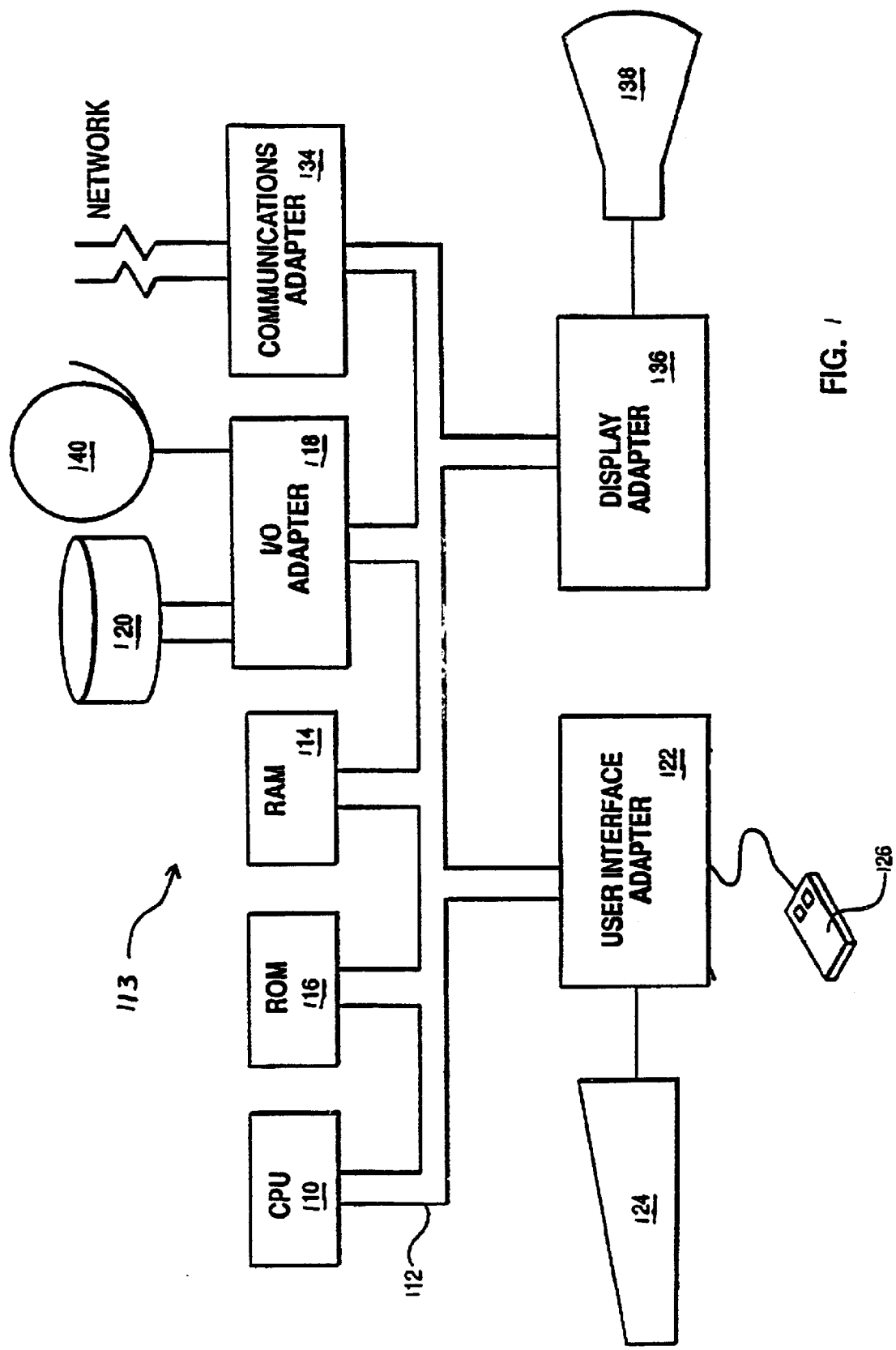
FIG. 1 is a system diagram of a data processing system, including hardware and firmware, which may be used to implement the present invention.

A representative hardware environment which can be used for practicing the present invention is depicted with reference to FIG. 1, which illustrates the typical hardware configuration of a data processing system 113 in accordance with the subject invention. The data processing system 113 includes a central processing unit (CPU) 110, such as a conventional microprocessor, and a number of other units interconnected via a system bus 112. The data processing system 113 includes a random access memory (RAM) 114 and a read only memory (ROM) 116. Also included are an I/O adapter 118 for connecting peripheral devices such as disk units 120 and tape drives 140 to the bus 112, a user interface adapter 122 for connecting a keyboard 124, a mouse 126 and/or other user interface devices such as a touch screen device (not shown) to the bus 112, a communication adapter 134 for connecting the data processing system 113 to a data processing network 142, and a display adapter 136 for connecting the bus 112 to a display device 138. The CPU 110 may include other circuitry not shown herein, which will include circuitry found within a microprocessor, e.g. execution unit, bus interface unit, arithmetic logic unit (ALU), etc. The CPU 110 may also reside on a single integrated circuit (IC).

Those skilled in the art will appreciate that the representative hardware environment depicted in FIG. 1 may be suitable not only to execute the entire system described within a single machine, but also to execute client-side and server-side applications in the client-server environments described.

Figure 2:
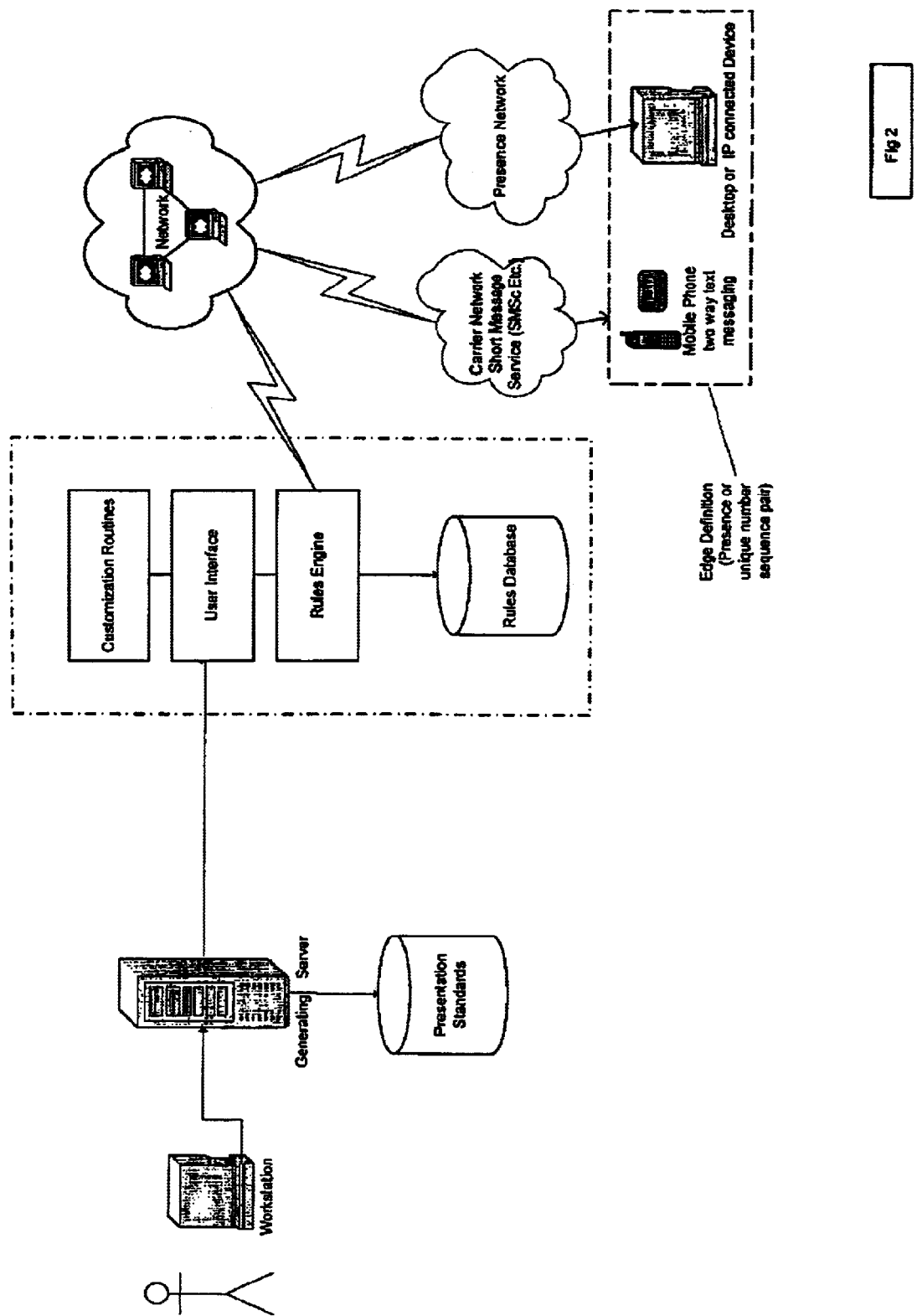
FIG. 2 is a system diagram of the stated network server system of the instant invention.

The hardware configuration and operation of the instant invention is described more completely with reference to FIG. 2. FIG. 2 depicts in block diagram form the stated system 202 of the instant invention. The stated system 202 comprises a interface component 204 which may be of the form of data processing system described previously with reference to FIG. 1. It should be noted, however, that the interface component 204 need not be a typical data processing system, but may be any device through which a user currently accesses a network. Accordingly, telephones, televisions, wrist watches, Personal Data Assistants (PDAs), palmtops, and laptops may be used as interface components 204 under the instant invention.

The interface component 204 is connectable through conventional telecommunications means to a generating server 208. The generating server 208 is electrically connected to a database of presentation standards 210. The function of the generating server 208 is to convert data intended for the user to a format acceptable to the interface component 204. The generating server 208 is also adapted to accept input data from the user at the interface component 204. Those skilled in the art will appreciate that, depending upon the type of interface component 204 supported, the generating. server 208 and ire presentation standards database 210 may be quite extensive, providing data translation to HTML, American Standard Code for Information Interchange (ASCII) text, Web Access Protocol (WAP), Java, XML, Wireless Markup Language (WML), Handheld Device Markup Language (HDML) or any other number of data formats acceptable to the interface component 204. In addition, for particular interface components 204 which are in specific vertical markets which use industry-specific formats, the generating server 208 and the presentation standards database 210 may provide for translation to those industry-specific formats, such as Open Financial Exchange (OFX) for financial vertical markets. More particularly, the presentation standards database 210 is of such a format to permit addition or modification of the different communications standards, without modification to the remainder of the stated system 202, so that the generating server 208 can provide a unified interface to a variety of different interface components 204.

As with the interface component 204, the generating server 208 may be of a hardware configuration similar to the data processing system described with reference to FIG. 1 previously. However, the generating server 208 may also take different forms in order to more fully suit its function in the instant context. Those skilled in the art will appreciate that the generating server 208 may generally be embodied in a single machine, but could be embodied in more than one machine, with processes running in parallel or series in order to optimize its operation. Those skilled in the art will also appreciate that, although the generating server 208 is shown as separate from the presentation standards database 210, the generating server 208 and the presentation standards database 210 may be incorporated into a single machine, still falling within the description of the present invention.

The generating server 208 is in data communication with a dynamic interface server 212. The dynamic interface server 212 comprises a user interface 214, a rules engine 216, a rules database 218, and customization routines 220. The function of the dynamic interface server 212 is to provide a dynamic interface for the user. The user interface 214 dictates the form of the data displayed to the user. The user interface 214 acts as a collection point for the other modules of the generating server 208, and a receipt point for information arriving from the user through the generating server 208.

The dynamic nature of the dynamic interface server 212 is provided through a rules engine 216. The rules engine determines and tracks the state of the dynamic interface server 212. The rules engine 216 is in data communication with the network 206. The network 206 may be of any protocol or type as are well-known in the art, including the Internet. The invention will be most useful when the network 206 to which it is connected is large enough to prohibit user manageability in a direct-connection process.

The rules engine 216 is also in data communication with the rules database 218. The rules database 218 defines the states available to the rules engine 216, along with the edges between the states and their associated conditions. The rules database 218 may also store information relating to the applicability of the rules. For example, some rules might be active only during certain time periods. Other rules might expire upon a certain event. The rules database 218 also stores the information for each state as to the result of each state.

The rules engine 216 monitors the network 206 and input from the user with reference to the rules database 218 to determine when there is a change in state according to the rules. When a change of state is detected by the rules engine 216, the rules engine 216 alerts the user interface 214, which in turn gives instructions to the generating server 208 to communicate the appropriate information to the user. Accordingly, the user is provided with dynamic information regarding the network 206.

For example, if the user establishes a rule to monitor for an e-mail message arriving from a certain person over the network 206, that rule may establish a persistent state so that the next access the user has to the system is sensitive to the fact that the alert has been sent and takes a particular action. In the example, the rules engine 216 could be programmed to automatically display the message that is the subject of the alert to the user upon the user's next login. Alternatively, the rule could be established to delete the message with no further action being taken. The extent and duration of the response of the system to activities on the network 206 or input from the user is broadly configurable to meet the situation of the user and the location of the system.

In order to provide access to the configurable qualities of the system, the dynamic interface server 212 also provides a set of customization routines 220 which permit the user to access and change the rules database 218. Through the customization routines 220, a user may add, modify, or delete rules from the rules database 218, thus defining the operation of the stated system 202 to best suit the user preferences and desires.

It will be appreciated by those skilled in the art that, although the dynamic interface server 212 is shown as a single machine in the FIG. 2 block diagram, the disclosure of the present invention equally permits a stated system 202 where the dynamic interface server 112 is contained within multiple machines, running in series or parallel. Similarly, the rules database 218 may be housed separately, as depicted with the generating server 208 and the presentation standards database 210. Conversely, the functionality of the dynamic interface server 212, the generating server 208 and the presentation standards database 210 may be combined within a single data processing system, all falling within the bounds of the instant invention.

Figure 3:
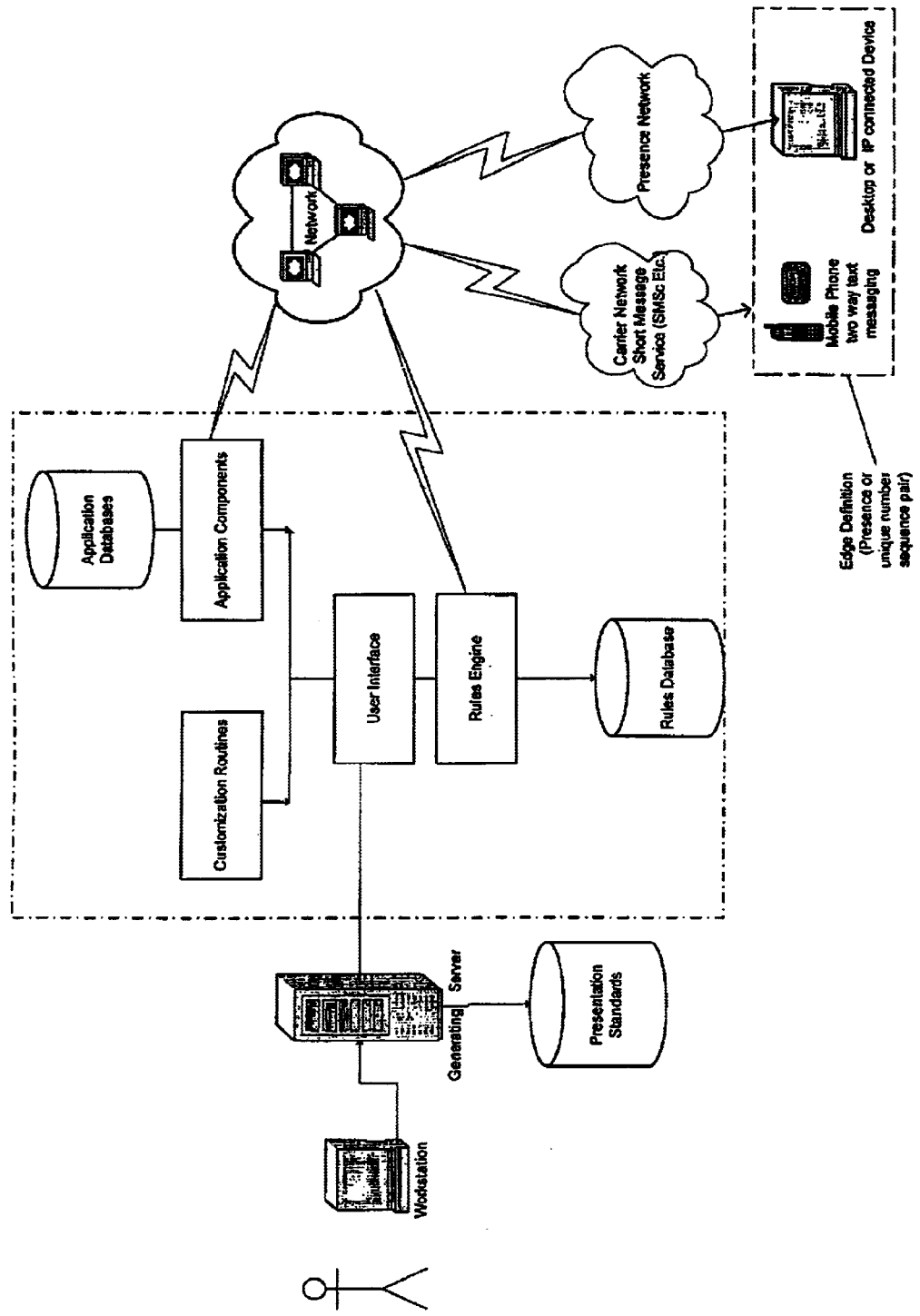
FIG. 3 is a system diagram of the stated network server system of the instant invention having the additional feature of application components.

An alternative embodiment of the instant invention is shown with reference to FIG. 3. FIG. 3 demonstrates an alternate stated system 302 which is adaptable to specific applications. The interface component 304, the generating server 308 and the presentation standards database 310 are the same as illustrated with reference to FIG. 2. The alternate dynamic interface server 312, however is modified to accommodate application components 322 and application databases 324 attachable to the user interface 314. The application databases 324 may be accessed according to specific protocols, such as Systems Management Server (SMS) or Simple Mail Transfer Protocol (SMTP) in a messaging context, or via certain modes of communication (dial-up lines, T1 direct connection, etc.), including via the network 306 (path not shown).

The application components 322 are operable to provide additional functionality and tracking capabilities to the alternate dynamic interface server 312. The application components 322 may link directly to the network 306 or may accept input from the user interface 314. The rules engine 316 may be modified to accept input from the application components 322 so that conditions from the application components 322 may act as conditions for moving between states within the rules engine 316. The rules engine 316 may also pass control or queries to the application components 322 in order to satisfy user needs.

Figure 4:
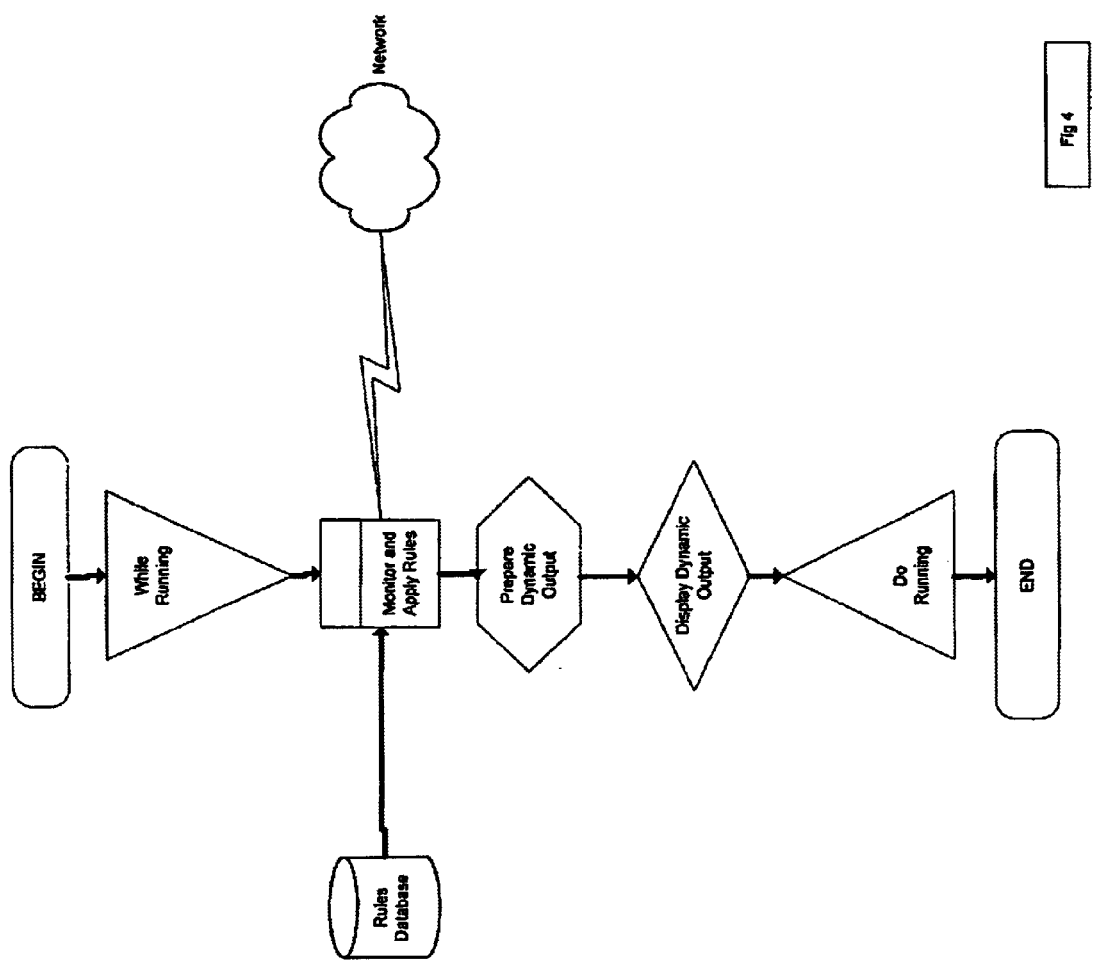
FIG. 4 is a flowchart according to ANSI/ISO standard 5807-1985 depicting the operation of the instant invention.

For example, the application components 322 may be a set of components specific to a banking application. In such an instance, the application components may permit funds transfers, account overviews, bill payment, and the like. In such an example, the application components 322 may be adapted to access an independent database 324 or to access the network 306 independently, The iterative operation of the instant invention is described with reference to FIG. 4. The operation begins 402 with the precondition of the hardware structure as described in FIGS. 2 and 3. Specifically, the operation assumes a generating server 308 and a dynamic generation server 312, which dynamic generation server 312 operates upon a rules engine 316 and a rules database 318.

The operation beings a looping process 404, nominated for purposes of illustration as RUNNING. The looping process can be infinite, but those skilled in the art will appreciate that the looping process will generally contain exceptions so that system administrators may shut the system down for maintenance, upgrades, repairs, and the like. Nonetheless, it will be appreciated that the process does not require exit from the looping under normal circumstances.

The operation begins by immediately monitoring and applying the rules 406. Monitoring the rules begins by reference to the rules database 408 and the network 410. The monitoring and application process 406 also provides facilities for modifying the rules as necessary. At the onset, the rules may be simple, such as defining a default state if a network 410 is detected. In such a case, the screen for the default state is prepared 412. The preparation 412 includes translating the data to the format and protocols acceptable to the user interface component. Once the preparation 412 is complete, the output is displayed 414 to the user. Iteration continues by again monitoring and applying the rules 406.

Part of the defined process of monitoring and applying the rules 406 is the process of modifying the rules within the rules database 408. Accordingly, using the same iterative process as described with reference to FIG. 4, the user may define additional states, edges, and conditions so that monitoring includes reference to those features.

Figure 5:
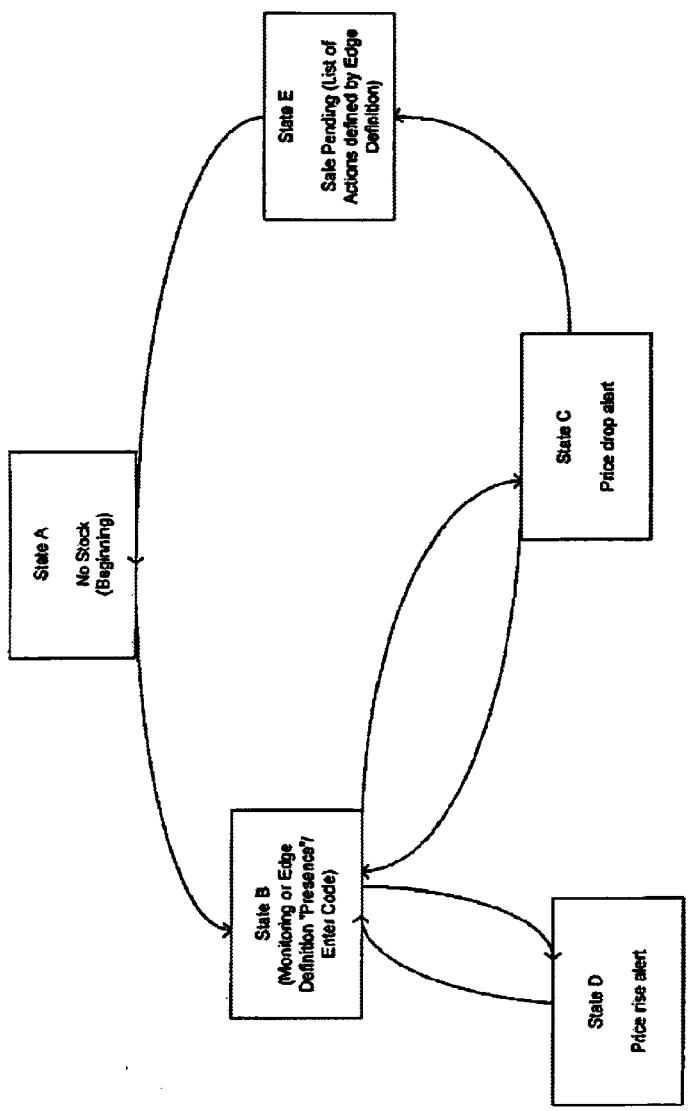
FIG. 5 is a state diagram demonstrating the operation of the instant invention in the context of a stock event.

The system of the instant invention operates inherently based upon states. Accordingly, example is provided with reference to FIG. 5 of the stated nature of the system. FIG. 5 assumes for demonstrative purposes a stock trading user who wishes to use the system to monitor a stock purchased and sold. In such a case, the rules database (FIG. 2, 218) is programmed with a set of rules to establish states, edges, and conditions as follows.

The rules database defines a State A 502 which represents that no stock is owned. Accordingly, the system would display a pre-defined message. In the alternative, the system could be set to display information directly from the network, such as a HTML or XML page or other information. In either case, the system can be sensitive to the execution of a purchase command. The definition of the purchase command defines an edge 504 having a condition of purchase.

When the user satisfies the condition of purchase 504, the state of the system changes to State B 506, representing a state of monitoring the stock. This State B 506 has several exit conditions: price up 508, price down 512, and sell 524. The system may detect from the network (FIG. 2, 206) the condition of the market in order to determine if one of the exit conditions are met. Also, the system may accept user input to determine if the sell 524 condition is met. However, as might be expected in the context of the stock trade, if there is no movement in the stock, the chances of a desire to sell are less likely. Accordingly, the State B 506 display may position the sell command at a more remote portion of the screen, leaving primary room to more pertinent information (such as current price, graphs, news, or other options).

Assuming that the price rises, the condition of edge 508 is satisfied, and the system passes to State D 518 to alert the user of the rise in price. After displaying the alert page, the system returns 510 to State B 506 without condition.

Should the stock price drop, the price down condition 512 is satisfied, and the system moves to State C 520 to issue an alert. This screen, however, may have additional options requiring user input. For example, the page might feature a hold command and a sell command, each corresponding to respective edge conditions 514, 516. In the event that the user indicates that the stock should be held 514, the system returns to State B 506. In the event that the user indicates sell 516, the system proceeds to State E 522.

State E 522 is entered when a sale is pending, either from State C 520 or from State B 506. The system may issue commands to the network (FIG. 2,206) and display a screen for a pending sale providing price information. The State E 522 screen may include the ability to abort the transaction by selecting an abort condition 526. Once the stock is successfully sold and confirmation of that sale is received from the network (FIG. 2, 206), a sold condition 528 is met and the edge is followed again to State A 502.

Notably, the user need not be logged into the system during each of the states described with reference to FIG. 5. As noted, the first time a user logs into the system, one state will be selected, in this case State A 502. However, if the user logs in subsequently and the system detects that a sale is pending, the user will begin in State E 522. Accordingly, rather than the user needing to tell the system to check for pending sales status, the system automatically provides that information because it has tracked the states since the user's last login.

While FIG. 5 provides a primitive example of the use of the instant invention in the context of a stock transaction model, those skilled in the art will readily recognize the applications of the instant invention to a wide variety of contexts such as banking, e-mail and messaging, investing, recreation, education, business, and government. By establishing a complex array of rules, which correspond to edges and states, a user or programmer may establish a system that displays exactly the network information desired, either in a custom format or in a format directly from the network.

As to the manner of operation and use of the present invention, the same is made apparent from the foregoing discussion. With respect to the above description, it is to be realized that although embodiments of specific material, representations, databases, and languages are disclosed, those enabling embodiments are illustrative and the optimum relationships for the parts of the invention are to include variations in composition, form, protocol, function, and manner of operation, which are deemed readily apparent to those skilled in the art in view of this disclosure. All relevant relationships to those illustrated in the drawings and this specification are intended to be encompassed in the present invention.

Therefore, the foregoing is considered as illustrative of the principles of the invention, and since numerous modifications will readily occur to those skilled in the art, it is not desired to limit the invention to the exact construction and operation shown or described. All suitable modifications and equivalents may be resorted to, falling within the scope of the invention.

What is claimed is:

1. A stated server system comprising:
   an interface component comprising an edge network, the edge network having the capability to broadcast an edge definition, the edge definition being a contextual value of an event prior to a state change;
   a dynamic interface server comprising a user interface, a rules engine, and a rules database, the dynamic interface server being object based, the interface component being connectable to the dynamite interface server via the edge network, the edge network transports the edge definition to the dynamic interface server, the dynamic interface serves transfers an object to the interface component based upon the edge definition, the edge network being defined by a relational state of the edge definition to the object, wherein the interface component is capable of rendering the transferred object; and
   a centralized network capable of communicating with the dynamic interface server, wherein the dynamic interface server maintains and tracks states during pre-defined time periods via the rules engine based upon the rules database by receiving the edge definition of the event and communicating state information to the interface component via the user interface.

2. The stated server system of claim 1 wherein during pre-defined time periods is continuously.

3. The stated server system of claim 2 wherein the dynamic interface server further comprises:
   a set of customization routines operable to modify the rules database.

4. The stated server system of claim 2 wherein the dynamic interface server further comprises:
   an application component,
   wherein the application component is used by the rules engine to determine the state.

5. The stated server system of claim 1 further comprising:
   a generating server having a presentations standards database,
   wherein the generating server is connectable between the interface component and the dynamic interface server, and
   wherein the generating server converts information from the dynamic interface server to a format readable by the interface component.

6. The stated server system of claim 1 wherein the dynamic interface server further comprises:
   a generating server having a presentations standards database,
   wherein the generating server converts state information into a format readable by the interface component.

7. The stated server system of claim 6 wherein the dynamic interface server further comprises:
   an application component, wherein the application component is used by the rules engine to determine the state.

8. The stated server system of claim 1 wherein the dynamic interface server further comprises:
   a set of customization routines operable to modify the rules database.

9. The stated server system of claim 1 wherein the dynamic interface server further comprises:
   an application component,
   wherein the application component is used by the rules engine to determine the state.

10. The stated server system of claim 1 wherein the edge network provides an input to the user interface based upon a change in state, the user interlace capable of transferring the object to the interface component without the need of being in communication with the centralized network.

11. The stated server system of claim 1 wherein the edge definition communicates context to data parameters that control a condition of the transferred object, the data parameters in communication with the dynamic interface server.

12. The stated server system of claim 11 wherein the edge definition facilitates context switching without the need for action by a user.

13. The stated server system of claim 1 wherein the object contains all the necessary logic, contest, relational, and data parameters to render itself upon communication with the edge network.

14. The stated server system of claim 1 wherein the pre-defined time periods are contextual data changes.

15. The stated server system of claim 1 wherein the contextual data is status, presence, condition, or mode.

16. The stated server system of claim 1 wherein the edge network is defined by a relational parameter between two or more objects and the contextual data at the point of the state change.

17. A method for accessing an edge network, the edge network is defined by a context of an edge definition, the method comprising the steps of:
   establishing an object based rules database defining states and states' relationship to the edge definition, the context being a presence, status, mode or condition of an event prior to a state change;
   accessing the edge network to determine a first state according to the object based rules database, the edge network having the capability to broadcast the edge definition;
   preparing an output display based upon the first state, the output display comprising information contained in the object based rules database; and
   displaying the output display.

18. The method of claim 17 further comprising the step of:
   modifying the object based rules database according to a user's specifications, the user's specification being one or more subscribed state changes, the state changes being defined by the context.

19. The method of claim 18 further comprising the step of:
   translating the output display to match a protocol of an interface component.

20. The method of claim 18 further comprising the step of:
   repeating the accessing, preparing, and displaying.

21. The method of claim 17 further comprising the step of:
   translating the output display to match a protocol of an interface component.

22. The method of claim 17 further comprising the step of:
   repeating the accessing, preparing, and displaying.

23. The method of claim 17 wherein the step of establishing an object based rules database comprises defining states of one-to-one or one-to-multiple subscribed edge definitions.

24. A computer-readable medium having therein a computer program operable upon a system having a rules database to provide stated access to an edge network comprising:

an initialization code comprising a set of codes operable to establish an object based on the rules database, the initialization code defining states and edges, the edges representing a status, presence, condition or mode of an event, the edges contain a relational state definition for the object;

a centralized network access code comprising a set of codes operable to access the edge network to determine a first state according to the rules database and the edges;

a preparation code comprising a set of codes operable to prepare an output display based upon the first state; and a display code comprising a set of codes operable to display the output display, the display code being encapsulated and parsed at a point of a routed destination.

25. The computer-readable medium of claim 24 further comprising:

a modification code comprising a set of codes operable to modify the rules database according to a user's specifications.

26. The computer-readable medium of claim 25 further comprising:

a translation code comprising a set of codes operable to translate the output display to match a protocol of an interface component.

27. The computer-readable medium of claim 25 further comprising:

a looping code comprising a set of codes operable to repeat execution of the edge network access, preparation, and display codes.

28. The computer-readable medium of claim 24 further comprising:

a translation code comprising a set of codes operable to translate the output display to match a protocol of an interface component.

29. The computer-readable medium of claim 24 further comprising:

a looping code comprising a set of codes operable to repeat execution of the edge network access, preparation, and display codes.

30. A computer-readable medium having stored there on a data structure comprising:

at least one state definition; and an edge definition for at least one of the state definitions, the edge definition being a presence, status, condition, or made of an event prior to a change in the state definition, the edge definition being part of an edge network, the event being a routable, logic-encapsulated object, wherein the state definition corresponds to a state of the edge network, the edge definition corresponds to a condition of changing states based upon a condition of the edge network.

31. The data structure of claim 30 wherein the state definition corresponds to a state of the routable, logic-encapsulated object.

* * * * *